United States Patent

Wood

[11] Patent Number: 6,078,394
[45] Date of Patent: Jun. 20, 2000

[54] WAVELENGTH MANAGER

[75] Inventor: Nigel R Wood, Brackley, United Kingdom

[73] Assignee: Marconi Communications Limited, United Kingdom

[21] Appl. No.: 09/012,887

[22] Filed: Jan. 23, 1998

[30] Foreign Application Priority Data

Jan. 27, 1997 [GB] United Kingdom .................... 9701627

[51] Int. Cl.⁷ ...................................................... G01B 9/02
[52] U.S. Cl. .......................... 356/352; 356/345; 356/346; 356/361
[58] Field of Search ..................................... 356/352, 345, 356/361, 346

[56] References Cited

U.S. PATENT DOCUMENTS 5,838,437  11/1998  Miller et al. ............................. 356/345

Primary Examiner—Robert H. Kim
Assistant Examiner—Andrew H. Lee
Attorney, Agent, or Firm—Kirschstein, et al.

[57] ABSTRACT

Scanning based wavelength measurement systems which are suitable for both localised and distributed WDM, High Density WDM, and coherent systems are based around the use of a fixed cavity Fabry-Perot Etalon which when the output of a tuneable laser is passed through it produces a number of reference equispaced transmission maxima. These maxima are used in a Scanning Heterodyne or Scanning Filter based Spectrometer for detection of the wavelength position of the transmitter.

9 Claims, 2 Drawing Sheets

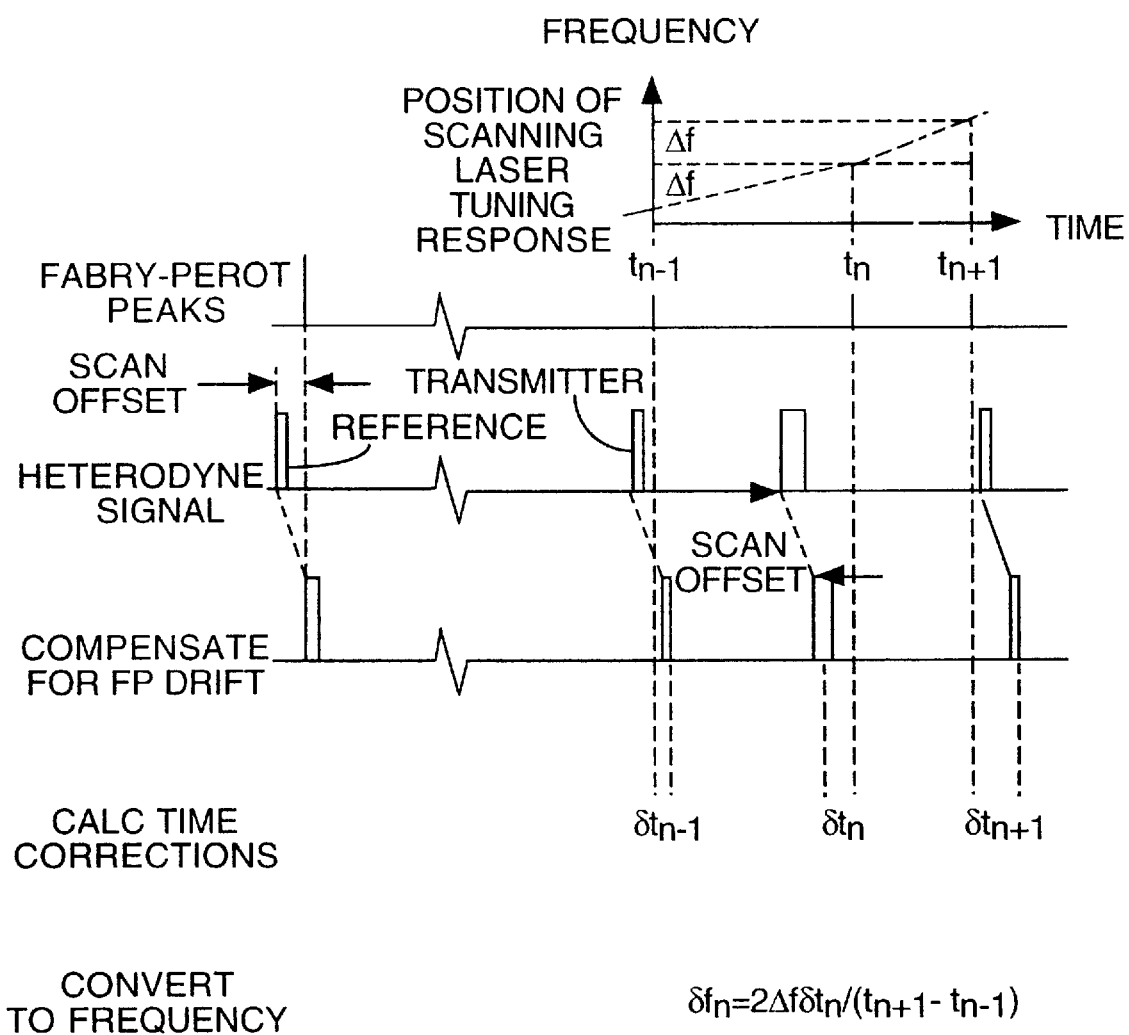

WAVELENGTH MANAGER

BACKGROUND OF THE INVENTION

The present invention relates to a technique to simply the design of Wavelength Management systems for use in High Density Wave Division Multiplexer. There is also included a system which is significantly less temperature sensitive than other similar designs.

SUMMARY OF THE INVENTION

The technique details a method reducing the complexity of scanning based wavelength measurement systems which is suitable for both localized and distributed WDM, High Density WDM, and coherent systems is based around the use of a fixed cavity Fabry-Perot Etalon which when the output of a tuneable laser (ramped in wavelength) is passed through it produces a number of reference equispaced transmission maxima. When this signal is used in a Scanning Heterodyne or Scanning Filter based Spectrometer the detection of the wavelength position of the transmitter is simplified.

According to the present invention there is provided an optical wavelength manager wherein a fixed cavity Fabry-Perot Etalon is used to produced equispaced transmission maxima to calibrate the scan range of a Scanning Heterodyne or Scanning Filter based optical spectrometer.

The above may be used in wavelength measurement system to control the inter-channel separation of optical transmitters in WDM, HDWDM and coherent-based systems.

BRIEF DESCRIPTION OF THE DRAWINGS

The present invention will now be described by way of example, with reference to the accompanying drawings, in which:

FIG. 2 graphically illustrates the calculation of frequency corrections.

FIG. 1 shows a schematic of a simplified Wavelength Management system. The core of the system is either a Scanning Heterodyne or Scanning Filter based spectrometer which monitors the transmitter comb produced by combining the transmitter signals in a passive optical network (PON). To the transmitter comb spectrum is added to an optical frequency reference whose operating point lies outside the comb of transmitters. This is the single stabilized component in the system and is stabilized by either using emission line or absorption line locking techniques.

Figure 1:
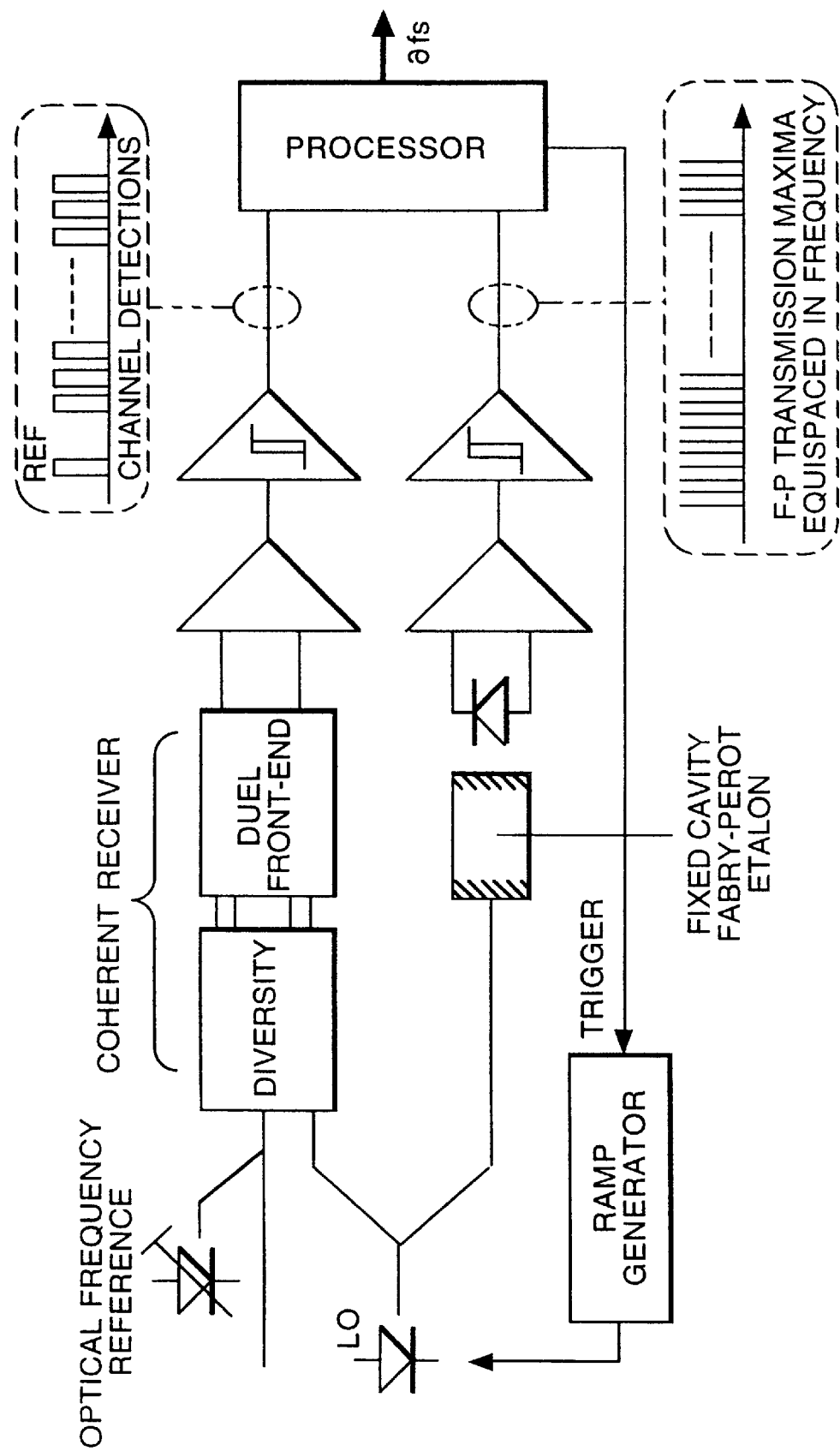
FIG. 1 shows a schematic of the Wavelength Management System.

A fixed cavity Fabry-Perot interferometer monitors the scanning LO laser. This provides a means by which the non-linearity of the LO laser can be measured. In addition, the spacing of the transmission comb of the Fabry-Perot can be set to the desired inter-transmitter frequency spacing. If it is assumed that the Etalon is formed from synthetic silica, for example, a 15 GHz comb spacing corresponds to a mirror of 6.9 mm.

For the operational transmitters to be indirectly locked to the transmission peaks of the Etalon, the stability of the spacing of the peaks is crucial. If the Etalon is not thermally stabilized, any changes in temperature will cause the peaks to drift.

Before examining the system operation further, it is appropriate to pause to examine the nature and magnitude of this problem of drift with temperature.

For a Fabry-Perot Etalon:

$$\lambda(peak) = \frac{2dn}{m}, \quad \text{where } m \text{ is a positive integer.} \quad [1]$$

$$= 2d_0(1 + \alpha T)\left(n_0 + \frac{dn}{dt}, T\right), \quad \text{where } n_0 \text{ and } d_0 \text{ are the refractive index and thickness of the silica at } T=0 \text{ and } \alpha \text{ is its linear expansion coefficient.}$$

$$= \frac{2t}{m} \quad \text{where } t \text{ is the optical thickness}$$

$$= \frac{2t_0}{m}(1 + \beta T) \quad \text{where } t_0 \text{ is the optical thickness at } T=0$$

and $$\beta = \alpha + \frac{dn}{dt}\frac{1}{n_0}$$

Now, $n_0 = 1.444$ for silica at 1550 nm and 20° C.

$\frac{dn}{dt} = 1.28E-5 / °C.$, and $\alpha = 5.5E-7 / °C. \therefore \beta = 9.4E-6 / °C.$ Differentiating equation [1] and substituting for $t_0$ gives:

$$\frac{d\lambda(peak)}{dT} = \frac{2t_0\beta}{m} = \lambda(peak)\beta$$

Therefore, converting to frequency, an individual line drifts with temperature at a rate of:

$$1.8\,GHz/°C.$$

If the change in peak separation is now considered:

$$\Delta f = \frac{c}{2t} = \frac{c}{2t_0(1+\beta T)}$$

This implies that a silica based Etalon designed for a comb period of 15 GHz at 20° C. will exhibit a comb period of 14.985 GHz at 125 ° C., which corresponds to an accumulated inaccuracy at the ends of the comb ±1 GHz—well within the capture ranges achievable by coherent receivers. Thus, although the comb drifts strongly with temperature, the line separation remains constant.

To counteract the line drift, the Fabry-Perot could be stabilised with respect to temperature by locking a transmission peak to the reference frequency, however this represents additional system complexity (and hence less reliability). It is therefore suggested that the Etalon remain a passive component, with the remainder of the system compensating for any thermal drift introduced by it. This will be explained in the following paragraphs which describe the spectrometer operation.

The spectrometer operates as follows. During a laser scan a processor notes the times at which the Fabry-Perot transmission peaks are observed and when optical signals are detected by the coherent receiver (FIG. 2), it then analyzes this data. In the case shown, the first signal detected during a scan at the coherent receiver will be the reference. The computer notes the elapsed time between this event and the detection of the next Fabry-Perot peak. This will be called the scan delay, and will change scan-to-scan as the ambient temperature of the Fabry-Perot changes (it is assumed the absolute reference remains stable with temperature). The processor then eliminates the Fabry-Perot drift by offsetting the time-of-detection of the remaining channels by the scan delay. For each channel, it then determines the delay between the time-of-detection and the closest Fabry-Perot maximum. It then converts this delay to a frequency deviation by interpolating the elapsed time between adjacent Fabry-Perot maxima, knowing this to represent a frequency sweep of 15 GHz. Knowing the instantaneous sweep speed (from the time to sweep a small and known frequency difference) the differential delay between the channel detection and its associated FP peak can be converted to a frequency deviation. FIG. 2 illustrates this process.

Once the frequency deviation of an individual transmitter from its assigned channel frequency has been determined, a correction message is sent via either a datagram overlay or dedicated electrical link to the transmitter unit concerned. The transmitter unit then takes appropriate remedial action, i.e. changing the operating conditions of its laser which will in turn change the emitted optical wavelength or frequency.

Thus, by exploiting frequency spacing of the maxima of the fixed Fabry-Perot Etalon whilst compensating for its thermal drift, the spectrometer is able to calculate the frequency difference of a transmitter irrespective of the tuning characteristic of the LO laser.

For the system to operate, certain conditions must, of course, be observed. These are detailed as follows:

a) The frequency-time characteristic of the scanning laser must be monotonic and have no significant structural features of a smaller scale than the Fabry-Perot comb spacing.

b) The sweep speed must be fast with respect to the rate of change of etalon temperature, otherwise the Fabry-Perot peaks will drift significantly during the scan. An error of ~0.1 GHz is acceptable over the scan time, this implies that the temperature may not drift by more than 0.05° C. over the scan. If the rate of temperature is 1° C./s, the scan must not take more than 50 ms. If the scan is to have a frequency resolution of ±0.5 GHz over an example wavelength scan range of 16 nm occupied by the 128 channels (0.125 nm channel spacing), then the temporal resolution of the peak detection system must be ±12.5 µs (equivalent to a 80 kHz clock). This resolution may be unnecessarily high however, the central lobe of a modulated spectrum of a 2 Gbit/s CPFSK signal has a spectral width of the order of 4 GHz.

c) At start up, the transmitter lasers must become operational within a window of ±5 GHz (This figure allows a 5 GHz 'guard band' between channel windows). This, for a device with a thermal tuning characteristic of 12.5 GHz/° C. and an electro-optic tuning characteristic of 600 MHz/mA, is equivalent to a temperature uncertainty of ±0.4° C. or a bias uncertainty of ±8 mA.

It should also be noted that unless averaging proves necessary it is not necessary to perform A/D conversion, but rather note the clock count at which the various phenomena are detected.

This might be accomplished using a level detector followed by a pulse shaper and an edge detector. As a CPFSK spectrum is single peaked and symmetrical, the spectral center may be taken as the algebraic mean of the pulse rise and fall times. The data capture is therefore trivial by today's microprocessor standards, amounting to no more than noting the value of a clock counter 128 times during the 50 ms sweep of the scanning laser. such a task would not overwhelm even a first-generation 8-bit microprocessor. The calculations to determine the frequency deviation of the transmitters can then be performed at leisure; transmitter lasers drift relatively slowly (of the order of MHz per second) and therefore correction need only be applied say every few seconds.

Naturally some temperature stabilization of the scanning LO laser will be required, if only to prevent premature ageing by elevated temperatures. The necessity for thermal control may also be governed by the device's electro-optic tuning range. This must at all times be adequate to compass the reference source and the transmitter comb, and this may require simple thermal control based on the device ambient temperature, noting that the rate of frequency change wrought by this control loop must be less than the scan speed in order to ensure that the frequency sweep remains monotonic.

I claim:

1. A method of thermally calibrating a scan range of an optical spectrometer operative for measuring frequencies of a plurality of optical transmitter signals from a plurality of optical transmitters, comprising the steps of:

a) optically scanning a Fabry-Perot etalon with a local oscillator to generate a plurality of transmission peaks equispaced in frequency;

b) detecting the transmitter signals from the transmitters using the local oscillator;

c) detecting an optical frequency reference signal using the local oscillator;

d) determining a scan offset by comparing, in time, one of the peaks with the reference signal, the scan offset being a function of the ambient temperature of the etalon; and e) offsetting, in time, the transmitter signals with the scan offset to obtain thermally-corrected times for the transmitter signals simultaneously with the measuring by the spectrometer.

2. The method as claimed in claim 1, wherein the scanning step is performed by a local oscillator laser, and wherein said one of the peaks is the first peak detected in time after the reference signal has been detected.

3. The method as claimed in claim 1, wherein the scan offset is a delay between said one of the peaks and the reference signal; and further comprising the step of converting the delay to a frequency deviation, and the step of sending the frequency deviation to each of the transmitters to adjust the respective frequency of each transmitter.

4. An arrangement for thermally calibrating a scan range of an optical spectrometer operative for measuring frequencies of a plurality of optical transmitter signals from a plurality of optical transmitters, comprising:

a) means for optically scanning a Fabry-Perot etalon with a local oscillator to generate a plurality of transmission peaks equispaced in frequency;

b) means for detecting the transmitter signals from the transmitters using the local oscillator;

c) means for detecting an optical frequency reference signal using the local oscillator;

d) means for determining a scan offset by comparing, in time, one of the peaks with the reference signal, the scan offset being a function of the ambient temperature of the etalon; and e) means for offsetting, in time, the transmitter signals with the scan offset to obtain thermally-corrected times for the transmitter signals simultaneously with the measuring by the spectrometer.

5. The arrangement as claimed in claim 4, wherein the local oscillator is a laser, and wherein the etalon has a fixed cavity.

6. The arrangement as claimed in claim 4, wherein both detecting means comprise a receiver.

7. The arrangement as claimed in claim 4, wherein the determining means and the offsetting means comprise a processor operative for detecting the first peak, in time, after the reference signal has been detected, and employing the first peak as said one of the peaks in the determination of the scan offset.

8. The arrangement as claimed in claim 6, wherein the scan offset is a delay between said one of the peaks and the reference signal, and wherein the processor is operative for converting the delay to a frequency deviation; and further comprising means for feeding the frequency deviation to each of the transmitters to adjust the respective frequency of each transmitter.

9. The arrangement as claimed in claim 4, wherein the reference signal is generated by an optical reference source.

* * * * *